(12) United States Patent
Koo et al.

(10) Patent No.: US 9,059,820 B2
(45) Date of Patent: Jun. 16, 2015

(54) METHOD FOR TRANSMITTING CHANNEL QUALITY INFORMATION, USER EQUIPMENT, METHOD FOR TRANSMITTING MULTI-USER DATA, AND BASE STATION

(75) Inventors: Ja Ho Koo, Anyang-si (KR); Wook Bong Lee, Anyang-si (KR); Jae Hoon Chung, Anyang-si (KR); Bin Chul Ihm, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 181 days.

(21) Appl. No.: 13/580,632

(22) PCT Filed: Feb. 9, 2011

(86) PCT No.: PCT/KR2011/000852
§ 371 (c)(1),
(2), (4) Date: Aug. 22, 2012

(87) PCT Pub. No.: WO2011/105706
PCT Pub. Date: Sep. 1, 2011

(65) Prior Publication Data
US 2012/0314676 A1  Dec. 13, 2012

Related U.S. Application Data

(60) Provisional application No. 61/306,967, filed on Feb. 23, 2010.

(30) Foreign Application Priority Data

Jun. 11, 2010  (KR) .................. 10-2010-0055386

(51) Int. Cl.
*H04B 7/00* (2006.01)
*H04L 1/00* (2006.01)
*H04B 7/04* (2006.01)
*H04B 7/06* (2006.01)
(Continued)

(52) U.S. Cl.
CPC ............ *H04L 1/0026* (2013.01); *H04B 7/0452* (2013.01); *H04B 7/0473* (2013.01); *H04B 7/0486* (2013.01); *H04B 7/0617* (2013.01); *H04B 7/0632* (2013.01); *H04W 72/12* (2013.01); *H04L 1/0031* (2013.01); *H04L 25/03949* (2013.01); *H04L 2025/03802* (2013.01)

(58) Field of Classification Search
None
See application file for complete search history.

(56) References Cited

U.S. PATENT DOCUMENTS

| 2005/0181833 | A1* | 8/2005 | Lee et al. ............... 455/562.1 |
| 2007/0223423 | A1* | 9/2007 | Kim et al. ................. 370/334 |
| 2008/0025336 | A1* | 1/2008 | Cho et al. ................. 370/432 |

(Continued)

FOREIGN PATENT DOCUMENTS

| WO | 02/078211 | 10/2002 |
| WO | 02/098088 | 12/2002 |

*Primary Examiner* — Kevin C Harper
(74) *Attorney, Agent, or Firm* — Lee, Hong, Degerman, Kang & Waimey

(57) ABSTRACT

The present invention relates to a wireless communication system. More particularly, the present invention relates to a method and apparatus which indicate, using multiple CQIs, channel quality in the event multiple users are scheduled in the same time/frequency area, and to a method and apparatus which estimate a channel state using said multiple CQIs. According to the embodiments of the present invention, a channel state can be estimated in a more accurate manner in a multi-user MIMO system.

16 Claims, 12 Drawing Sheets

(51) Int. Cl.
*H04W 72/12* (2009.01)
*H04L 25/03* (2006.01)

(56) References Cited

U.S. PATENT DOCUMENTS

| | | |
|---|---|---|
| 2008/0043874 A1* | 2/2008 | Lee et al. ....................... 375/267 |
| 2009/0074099 A1* | 3/2009 | Zheng et al. .................. 375/267 |
| 2009/0141648 A1* | 6/2009 | Imamura et al. ............... 370/252 |
| 2009/0303900 A1* | 12/2009 | Cho et al. ....................... 370/252 |
| 2009/0323849 A1 | 12/2009 | Bala et al. |
| 2011/0081865 A1* | 4/2011 | Xiao et al. ..................... 455/63.1 |
| 2011/0176629 A1* | 7/2011 | Bayesteh et al. ............... 375/267 |
| 2012/0008511 A1* | 1/2012 | Fan et al. ....................... 370/252 |
| 2012/0076032 A1* | 3/2012 | Mundarath et al. ............ 370/252 |

* cited by examiner

FIG. 10

Multi-CQI signaling to BS

| Number of streams | UE 1 | UE 2 | UE 3 | UE 4 |
|---|---|---|---|---|
| 1 | CQI 1,1 | CQI 2,1 | CQI 3,1 | CQI 4,1 |
| 2 | CQI 1,2 | CQI 2,2 | CQI 3,2 | |
| 3 | CQI 1,3 | | CQI 3,3 | |
| 4 | CQI 1,4 | | | |
| RANK | 4 | 2 | 3 | 1 |

FIG. 11

| Number of streams | Channel Quality of each paired cases | UE 1 | UE 2 | UE 3 | UE 4 |
|---|---|---|---|---|---|
| 1 | CQ 1 | CQ1 | | | |
| | CQ 2 | | CQ2 | | |
| | CQ 3 | | | CQ3 | |
| | CQ 4 | | | | CQ4 |
| 2 | CQ 1,2 | CQ1,2 | CQ1,2 | | |
| | CQ 1,3 | CQ1,3 | | CQ1,3 | |
| | CQ 1,4 | CQ1,4 | | | CQ1,4 |
| | CQ 2,3 | | CQ2,3 | CQ2,3 | |
| | CQ 2,4 | | CQ2,4 | | CQ2,4 |
| | CQ 3,4 | | | CQ3,4 | CQ3,4 |
| 3 | CQ 1,2,3 | CQ1,2,3 | CQ1,2,3 | CQ1,2,3 | |
| | CQ 1,2,4 | CQ1,2,4 | CQ1,2,4 | | CQ1,2,4 |
| | CQ 1,3,4 | CQ1,3,4 | | CQ1,3,4 | CQ1,3,4 |
| | CQ 2,3,4 | | CQ2,3,4 | CQ2,3,4 | CQ2,3,4 |
| 4 | CQ 1,2,3,4 | CQ1,2,3,4 | CQ1,2,3,4 | CQ1,2,3,4 | CQ1,2,3,4 |
| | RANK | 4 | 2 | 3 | 1 |

Selection of users to be co-scheduled

: highest → select

METHOD FOR TRANSMITTING CHANNEL QUALITY INFORMATION, USER EQUIPMENT, METHOD FOR TRANSMITTING MULTI-USER DATA, AND BASE STATION

CROSS-REFERENCE TO RELATED APPLICATIONS

This application is the National Stage filing under 35 U.S.C. 371 of International Application No. PCT/KR2011/000852, filed on Feb. 9, 2011, which claims the benefit of earlier filing date and right of priority to Korean Application No. 10-2010-0055386, filed on Jun. 11, 2010, and also claims the benefit of U.S. Provisional Application Ser. No. 61/306,967, filed on Feb. 23, 2010, the contents of which are all incorporated by reference herein in their entirety.

FIELD OF THE INVENTION

The present invention relates to wireless communication. More particularly, the present invention relates to a channel quality transmission method and apparatus in a wireless communication system, and to a method and apparatus for allocating data respective to multi-users to a resource area and transmitting the allocated data.

BACKGROUND ART

Recently, Multiple Input Multiple Output (MIMO) systems have been spot-lighted as the broadband wireless mobile communication technology. Herein, the MIMO system refers to a system, which is used for enhancing communication efficiency by using multiple antennas.

Depending upon whether or not identical data are being transmitted, the MIMO system may be operated by using a spatial multiplexing scheme or a spatial diversity scheme. Herein, the spatial multiplexing scheme refers to a data transmission method (or scheme) enabling data to be transmitted at a fast rate without having to increase the bandwidth of the system, by allowing different sets of data to be transmitted through multiple transmission antennas. The spatial diversity scheme refers to a data transmission method (or scheme) transmitting the same data from multiple transmission antennas, so as to gain transmission diversity. An example of such spatial diversity scheme is Space Time Channel coding.

Additionally, depending upon the number of user equipments being allocated to the same time/frequency area, the MIMO system may be divided into an SU-MIMO (Single User MIMO) and an MU-MIMO (Multi User MIMO). An interval including the time/frequency area may also be referred to a resource area. In the SU-MIMO, one user equipment may be allocated to one resource area. And, in the MU-MIMO, multiple users may be allocated to one resource area. Generally, the performance of the SU-MIMO is more efficient, when the number of users is small. And, the performance of the MU-MIMO is more efficient, when the number of users is large.

However, a wireless channel has non-ideal characteristics, such as path loss, noise, fading effect caused by a multipath, ISI (Inter-Symbol Interference), or a Doppler effect caused by the mobility of the user equipment. Accordingly, diverse techniques are being researched and developed, in order to overcome the above-mentioned non-ideal characteristics and to elevate reliability in mobile communication. Depending upon the presence or absence of channel information feedback from each receiving end to each transmitting end, each of the SU-MIMO and the MU-MIMO may be differentiated as an open-loop mode and a closed-loop mode. The open-loop mode may include an STIC (Space-Time Trellis Code) method, wherein the transmitting end transmits information in parallel, and wherein the receiving end detects the transmitted signal by repeatedly using a ZF (Zero Forcing) method and an MMSE (Minimum Mean Square Error) method, and wherein the receiving end then uses a BLAST region, which can increase the information amount as much as the number of transmission antennas, and a space region (or area), so as to acquire transmission diversity and coding gain. Additionally, the closed-loop method corresponds to a method, wherein the receiving end first estimates the status of the radio channel and, then, transmits the estimated channel status as adequate feedback information to the transmitting end, and wherein the transmitting end controls the channel quality based on the channel status information obtained from the feedback information. Techniques for elevating the reliability in wireless communication may include AMC (Advanced Modulation and Coding). A wireless communication system may use a CQI (channel quality indicator) in order to support the AMC. Herein, the CQI corresponds to information respective to the channel status between the base station and the user equipment. The base station may use the CQI, which is received from the user equipment, in order to decide an MCS (Modulation and Coding Scheme) which is used to perform transmission. By using the CQI, when the channel status is determined to be good, the base station may increase a modulation order or may increase the coding rate, so as to increase the transmission rate. And, by using the CQI, when the channel status is determined to be poor, the base station may decrease a modulation order or may decrease the coding rate, so as to decrease the transmission rate. Once the transmission rate is decreased, the reception error occurrence rate may also be decreased.

Generally, user equipments performing MU-MIMO in the same resource area operate in a group. However, due to the channel interference between the user equipments, the channel performance may be degraded. Therefore, a method for reducing the channel interference between user equipments performing MIMO in the same resource area is required to be researched and developed.

DETAILED DESCRIPTION OF THE INVENTION

Technical Objects

The present invention provides a method and apparatus for more accurately indicating channel status.

Additionally, the present invention also provides a method and apparatus for reducing estimation differences in the channel status.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

The present invention provides a method and apparatus for indicating channel quality corresponding to a case when multiple users are scheduled to the same time/frequency area by using multiple CQIs, and the present invention also provides a method and apparatus for estimating channel status by using the multiple CQIs.

As an aspect of the present invention, a method of transmitting, by a user equipment among a plurality of user equipments, channel quality indication information in a wireless communication system, where the plurality of user equipments are capable of simultaneously receiving signals transmitted from a base station, is provided. The method comprises: receiving a reference signal from the base station; estimating a channel quality of the user equipment based on the reference signal; and transmitting channel quality indication information indicating the channel quality to the base station. Herein, the channel quality indication information may include information indicating channel quality for a case when data of the user equipment and data of at least one or more other user equipments are allocated together to a resource area.

As another aspect of the present invention, a user equipment of transmitting channel quality indication information in a wireless communication system, where a plurality of user equipments are capable of simultaneously receiving signals transmitted from a base station, is provided. The user equipment comprises: a receiver configured to receive a reference signal from the base station; and a processor configured to control the receiver to receive a reference signal transmitted from the base station and to generate channel quality indication information indicating a channel quality estimated based on the reference signal; a transmitter configured to transmit the channel quality indication information to the base station under the control of the processor. Herein, the channel quality indication information may include information indicating channel quality for a case when data of the user equipment and data of at least one or more other user equipments are allocated together to a resource area.

As further another aspect of the present invention, a method for transmitting, by a base station data in a wireless communication system, where the base station is capable of simultaneously transmitting signals to a plurality of user equipments, is provided. The method comprises: calculating channel quality for each combination of user equipments to be allocated to a resource area based on channel quality indication information received from each of the plurality of user equipments; selecting a best combination of user equipments having a best channel quality; modulating and encoding data of user equipments belonging to the best combination in accordance with an MCS (Modulation and Coding Scheme) selected based on the best channel quality; transmitting the modulated and encoded data to the user equipments belonging to the best combination on the resource area. Herein, the channel quality indication information of each of the plurality of user equipments may include information indicating channel quality for a case when data of a corresponding user equipment and data of at least one or more other user equipments are allocated together to the resource area.

As a still further aspect of the present invention, a base station in a wireless communication system, where the base station is capable of simultaneously transmitting signals to a plurality of user equipments, is provided. The base station comprises: a receiver configured to receive signals from the plurality of user equipments; and a processor configured to calculate channel quality for each combination of user equipments to be allocated in a resource area based on channel quality indication information received from each of the plurality of user equipments, wherein the channel quality indication information of each of the plurality of user equipments includes information indicating channel quality for a case when data of a corresponding user equipment and data of at least one or more other user equipments are allocated together to the resource area; and to select a best combination of user equipments having a best channel quality; a transmitter configured to modulate and encode data of user equipments belonging to the best combination in accordance with an MCS (modulation and coding scheme) selected based on the best channel quality under the control of the processor; and to transmit the modulated and encoded data to the user equipments belonging to the best combination the resource area.

In each aspect of the present invention, the channel quality indication information may include at least one or more channel quality indicators, wherein the at least one or more channel quality indicators is calculated based on a number of the other user equipments.

Additionally, in each aspect of the present invention, the number of channel quality indicators included in the channel quality indication information may be limited by a channel rank of the user equipment.

Furthermore, in each aspect of the present invention, the base station may transmit information, which indicates the maximum number of streams allocable to the resource area, to the user equipment.

The technical objects of the present invention merely correspond to a portion of the exemplary embodiments of the present invention. Therefore, various embodiments of the present invention reflecting the technical characteristics of the present invention may be devised and understood by anyone skilled in the art based on detailed description of the present invention, which will be provided below.

Effects of the Invention

In a wireless communication system according to the exemplary embodiments of the present invention, the transmission of multiple CQIs may be advantageous in that the occurrence of a mismatch in CQIs during MU-MIMO communication can be reduced.

Additionally, by enabling an MCS level adequate for the channel status to be selected based on an accurate CQI, the channel interference may be reduced.

Furthermore, multiple CQIs are used for selecting the user equipments, which are to be operated in the MU-MIMO mode, the multiple CQIs may contribute to the overall system throughput and to the efficiency of the wireless communication efficiency.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 10 and FIG. 11 illustrate examples for describing a process for selecting multi user equipments.

BEST MODE FOR CARRYING OUT THE PRESENT INVENTION

Figure 1:
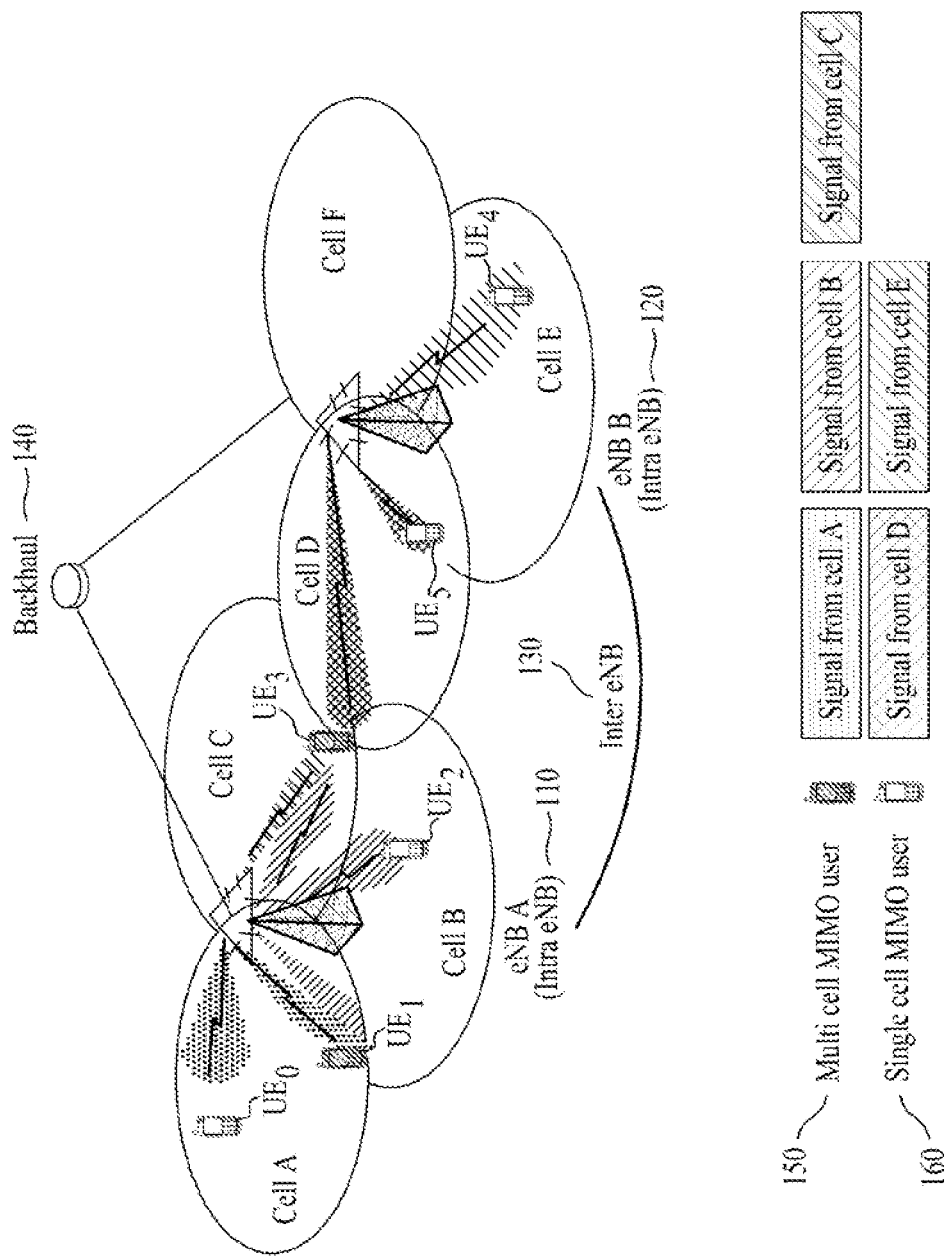
FIG. 1 illustrates a conceptual view of a wireless communication system, to which the present invention may be applied.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide a full and complete understanding of the present invention. However, it will be apparent to those skilled in the art that the present invention can be realized even without the detailed features described herein. For example, the present invention will be described in detail as follows based on an assumption that the mobile communication system used in the present invention corresponds to a 3GPP LTE system. However, with the exception for the unique features of the 3GPP LTE system, other mobile communication systems may also be randomly applied in the present invention.

In some cases, in order to avoid any ambiguity in the concept of the present invention, some of the structures and devices disclosed in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

FIG. 1 illustrates a conceptual view of a wireless communication system to which the present invention may be applied. The wireless communication system includes at least one Base Station. Each BS (110, 120, 130) provides a communication service to a User Equipment (UE) that is located in a specific geological region (generally referred to as a cell) (Cell A, Cell B, . . . , Cell F). The UE may either be fixed or mobile. Diverse devices communicating with the BS in order to transmit and/or receive user data and/or diverse control information may correspond to the UE. The term UE may also be referred to as Terminal Equipment, MS (Mobile Station), MT (Mobile Terminal), UT (User Terminal), SS (Subscribe Station), wireless device, PDA (Personal Digital Assistant), wireless modem, handheld device, and so on. A BS generally refers to a fixed station that communicates with a UE and/or another BS. The BS communicates with the UE and another BS in order to exchange diverse data and control information to and from one another. The term BS may also be referred to as eNB (evolved-Node B), BTS (Base Transceiver System), Access Point, and so on.

In a Multi Cell environment, an intra base station (110, 120) and an inter base station (130) exist. The intra base station is configured of several cells (or sectors). And, cells sharing the same base station as the cells, to which the specific user equipment belongs, correspond to cells respective to the intra base station (110, 120) of the cells, to which the specific user equipment belongs. And, the cells belonging to other base stations correspond to cell respective to the inter base station (130) of the cells, to which the specific user equipment belongs. Meanwhile, the intra base station for the specific cell may also be referred to as a serving base station, and the inter base station may also be referred to as a neighboring base station. As described above, cells being based on the same base station as the specific user equipment may receive and transmit information (e.g., data, Channel Quality Control Information) to and from one another through an x2 interface. However, other cell being based on other base stations may receive and transmit inter-cell information to and from one another through a backhaul (140). As shown in FIG. 1, a single cell MIMO user (160) may communicate with one base station through one cell (sector), and a multiple cell MIMO user (150), which is located at the cell boundary, may communicate with multiple base stations through multiple cells (sectors). For example, in a single cell MIMO user (160), UE0 may perform communication with eNB A in Cell A, and UE2 may perform communication with eNB A in Cell B. UE4 may perform communication with eNB B in Cell E, and UE5 may perform communication with eNB B in Cell D. In a multiple cell MIMO) user (150), UE1 may perform communication with eNB A in Cell A and Cell C, and UE3 may perform communication with eNB A in Cell B and cell C and may also perform communication with eNB B in cell D.

Figure 2:
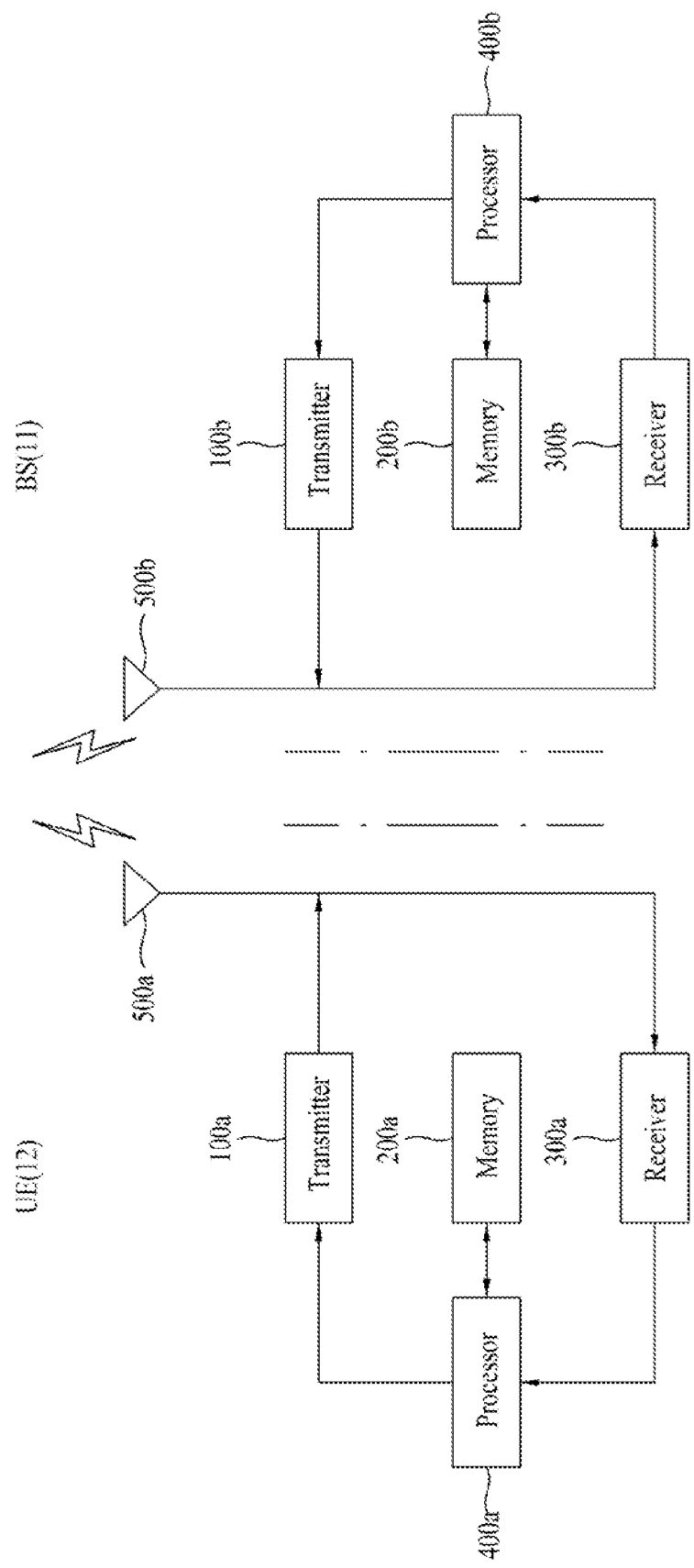
FIG. 2 illustrates a block view showing elements configuring a user equipment and base station performing the method according to the present invention.

FIG. 2 illustrates a block view showing elements configuring a user equipment and base station performing the method according to the present invention.

The user equipment (12) operates as a transmitting device in an uplink and operates as a receiving device in a downlink. Conversely, the base station (11) operates as a receiving device in an uplink and operates as a transmitting device in a downlink.

Each of the user equipment (12) and the base station (11) includes antenna(s) (500a, 500b) that can receive information and/or data, signals, messages, and so on, a transmitter (100a, 100b) transmitting messages by controlling the antenna(s), a receiver (300a, 300b) receiving messages by controlling the antenna(s), and a memory (200a, 200b) storing diverse information related to communication within the wireless communication system. Also, each of the user equipment (12) and the base station (11) includes a processor (400a, 400b), which is configured to perform the present invention by controlling the elements included in the user equipment (12) and the base station (11), such as the transmitter and the receiver, and the memory, and so on. The transmitter (100a), the receiver (300a), the memory (200a), and the processor (400a) included in the user equipment (12) may each be implemented as independent elements by using separate chips, or a combination of at least two or more elements may be implemented by using a single chip. Similarly, the transmitter (100b), the receiver (300b), the memory (200b), and the processor (400b) included in the base station (11) may each be implemented as independent elements by using separate chips, or a combination of at least two or more elements may be implemented by using a single chip. The transmitter and receiver may also be combined so as to be implemented as a single transceiver within the user equipment or the base station.

The antenna (500a, 500b) performs the function of transmitting a signal, which is generated from the transmitter (100a, 100b), to an outside target, or the antenna (500a, 500b) performs the functions of receiving a radio signal from an outside source and delivering the received radio signal to the receiver (300a, 300b). In case of a transceiving module supporting the Multi-Input Multi-Output (MIMO) function, which transmits and receives data by using multiple antennas, the transceiving module may be connected to 2 or more antennas.

The processor (400a, 400b) generally controls the overall operations of each module within the user equipment (12) or the base station (11). Most particularly, the processor (400a, 400b) may perform various control functions for performing the present invention, MAC (Medium Access Control) frame variable control functions respective to service characteristics and frequency environments, power saving mode functions for controlling idle mode operations, Hand Over functions, certification and encryption functions, and so on. The processor (400a, 400b) may also be referred to as a controller, a microcontroller, a microprocessor, a microcomputer, and so on. Meanwhile, the processor (400a, 400b) may be implemented in the form of hardware or firmware, or software, or in a combination of at least two or more of hardware, firmware, and software. In case of implementing the embodiments of the present invention by using hardware, ASICs (Application Specific Integrated Circuits) or DSPs (Digital Signal Processors), DSPDs (Digital Signal Processing Devices), PLDs (Programmable Logic Devices), FPGAs (Field Programmable Gate Arrays), and so on, which are configured to perform the present invention, may be provided in the processor (400a, 400b). Meanwhile, in case of implementing the embodiments of the present invention by using firmware or software, the firmware or software may be configured to include a module, procedure, or function performing the above-described functions or operations, and the firmware or software, which is configured to perform the present invention may be provided in the processor (400a, 400b), or may be stored in the memory (200a, 200b) so as to be operated by the processor (400a, 400b).

The transmitter (100a, 100b) performs coding and modulation on signals and/or data that are to be scheduled, by the processor (400a, 400b) or by a scheduler being connected to the processor, to be transmitted to an outside target and, then, transmits the processed signals and/or data to the antenna (500a, 500b). For example, the transmitter (100a, 100b) converts a data sequence that is to be transmitted to K number of signal sequences by performing de-multiplexing, channel encoding, and modulation processes. The K number of signal sequences passes through a transmission processor included in the transmitter, so as to be transmitted through the transmitting antenna (500a, 500b). The transmitter (100a, 100b) and the receiver (300a, 300b) of the user equipment (12) and the base station (11) may each be differently configured depending upon the procedures for processing the transmission signal and the reception signal.

Figure 3:
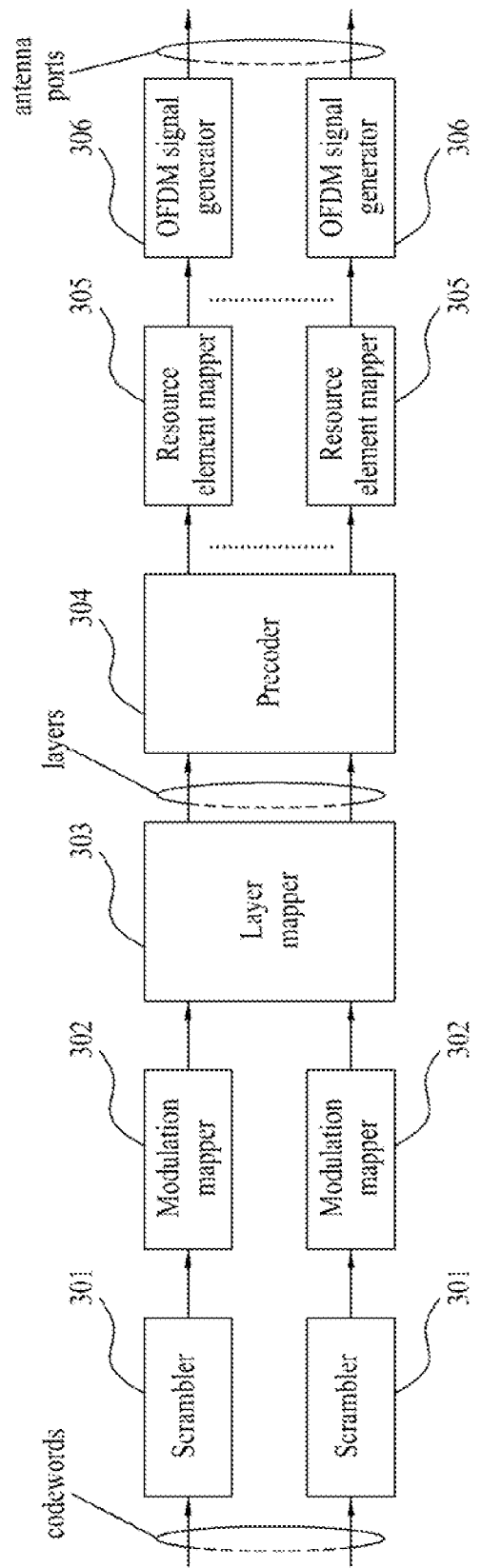
FIG. 3 illustrates a signal processing procedure in accordance with an OFDMA (Orthogonal Frequency Division Multiple Access) method.

FIG. 3 illustrates a signal processing procedure in accordance with an OFDMA (Orthogonal Frequency Division Multiple Access) method.

The transmitter included in the user equipment or the base station may transmit at one or more codewords. Each of the one or more codewords may be scrambled by a scrambler (301) and may be modulated to complex-valued symbols by a modulation mapper (302). A layer mapper (303) maps the complex-valued symbols to one or more transmission layers, and a precoder (304) multiplies complex-valued symbols of the one or more transmission layers by a predetermined precoding matrix W, which is selected in accordance with a channel status, so as to output complex-valued symbols for each antenna. The precoder (304) may use both of a codebook method and a non-codebook method. The complex-valued symbols for each antenna are respectively mapped to time-frequency resource elements, which are to be used for transmission, by a resource element mapper (305), and the complex-valued symbols for each antenna that are mapped to the respective time-frequency resource elements are modulated by an OFDM signal generator (306) by using an OFDM method, thereby being transmitted on each antenna port in the form of OFDM symbols for each antenna port. The OFDM signal generator may perform IFFT (Inverse Fast Fourier Transform) on an input symbol, and a CP (cyclic prefix) may be inserted in a time domain symbol being processed with IFFT. The OFDM symbol is transmitted through each antenna.

For reference, since the OFDMA method can increase frequency efficiency and cell capacity, the OFDMA method is most frequently used for downlink transmission. However, the OFDMA method may also be used for uplink transmission.

In FIG. 3, among the diverse signal processing procedures, the OFDMA (Orthogonal Frequency Division Multiple Access) method is given as an example and described accordingly. However, the user equipment may also process an uplink signal by using an SC-FDMA (Single Carrier Frequency Division Multiple Access) method and transmit the processed uplink signal to the base station. The transmitter of the SC-FDMA method may include 1 scrambler (301), 1 modulation mapper (302), a precoder (304), and 1 resource element mapper (305). The scrambler (301) of the user equipment may use a user equipment specific scrambling signal so as to scramble a transmission signal, and the modulation mapper (302) modulates the scrambled signal to a complex-valued signal by using a BPSK method, a QPSK method, or a 16 QAM method, depending upon the type of transmission signal and, or channel status. The modulated complex-valued signal is then precoded by the precoder (304), and the precoded complex-valued signal is mapped to time-frequency resource element(s), which is to be used for an actual transmission, by the resource element mapper (305). The signal that is mapped to the resource element(s) may be transmitted to the base station through the antenna in the form of an SC-FDMA signal. The user equipment adopting the SC-FDMA signal processing method may be provided with an SC-FDMA signal generator, which converts the signal being mapped to the resource element(s) to an SC-FDMA signal.

For reference, the user equipment may be implemented to adopt both the OFDMA method and the SC-FDMA signal processing method. And, the user equipment may also be designed to use both methods by switching from the OFDMA method to the SC-FDMA method, and vice versa, depending upon the channel environment.

Figure 4:
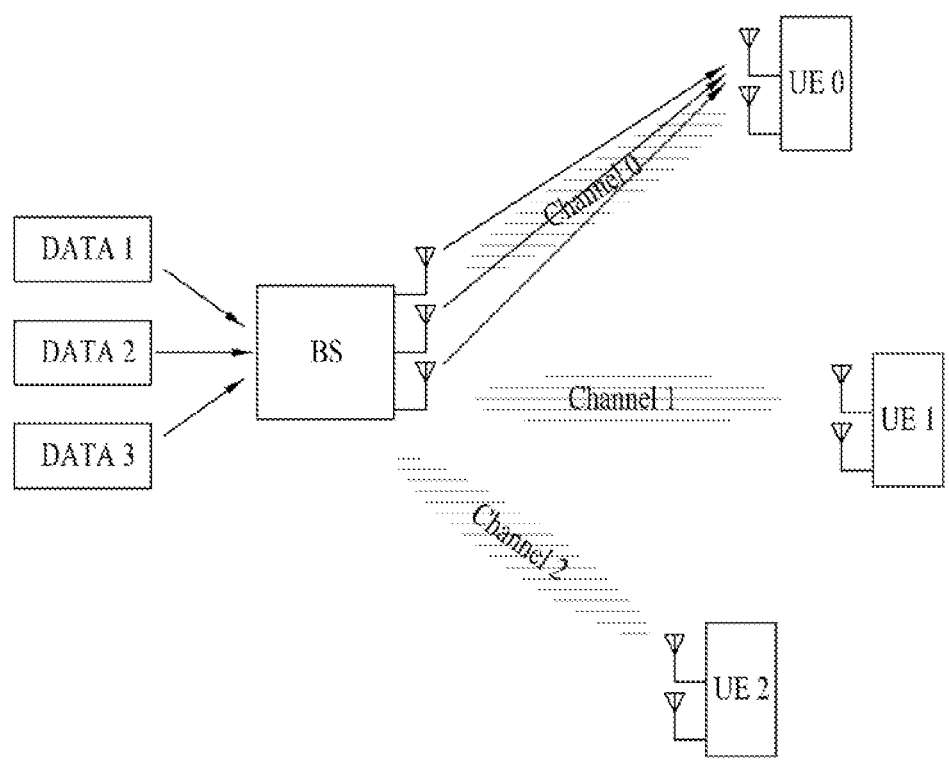
FIG. 4 illustrates an example of a single-user MIMO.

FIG. 4 illustrates an example of a single-user MIMO. And, FIG. 5 illustrates an example of a multiple-user MIMO.

As shown in the example of a single user MIMO shown in FIG. 4, the single user MIMO corresponds to a structure wherein multiple data streams, each being different from one another, transmitted from the base station are all transmitted to a single user. In case of the single user MIMO, a MIMO channel consists of one transmitting device and one receiving device in case of the single user MIMO, one user may receive all of the transmitted signals. More specifically, in case of the single user MIMO, only the data for a single user are scheduled to the same time/frequency area.

Figure 5:
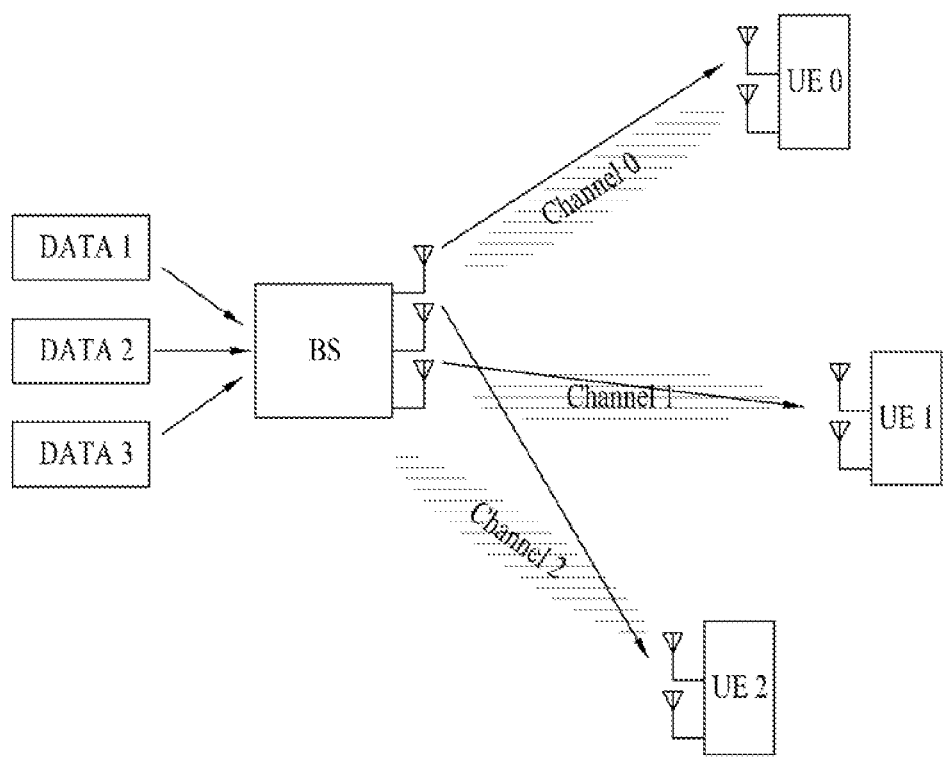
FIG. 5 illustrates an example of a multiple-user MIMO.

As shown in the example of a multiple-user MIMO shown in FIG. 5, the multiple-user MIMO respectively transmits the multiple data streams, each being different from one another and being transmitted from the base station, to the multiple users. In case of the multiple-user MIMO, one transmitter and multiple receivers collectively configure the MIMO channel. In other words, in case of the multiple-user MIMO, the data respective to the multiple users may be scheduled together to the same time/frequency area.

Figure 6:
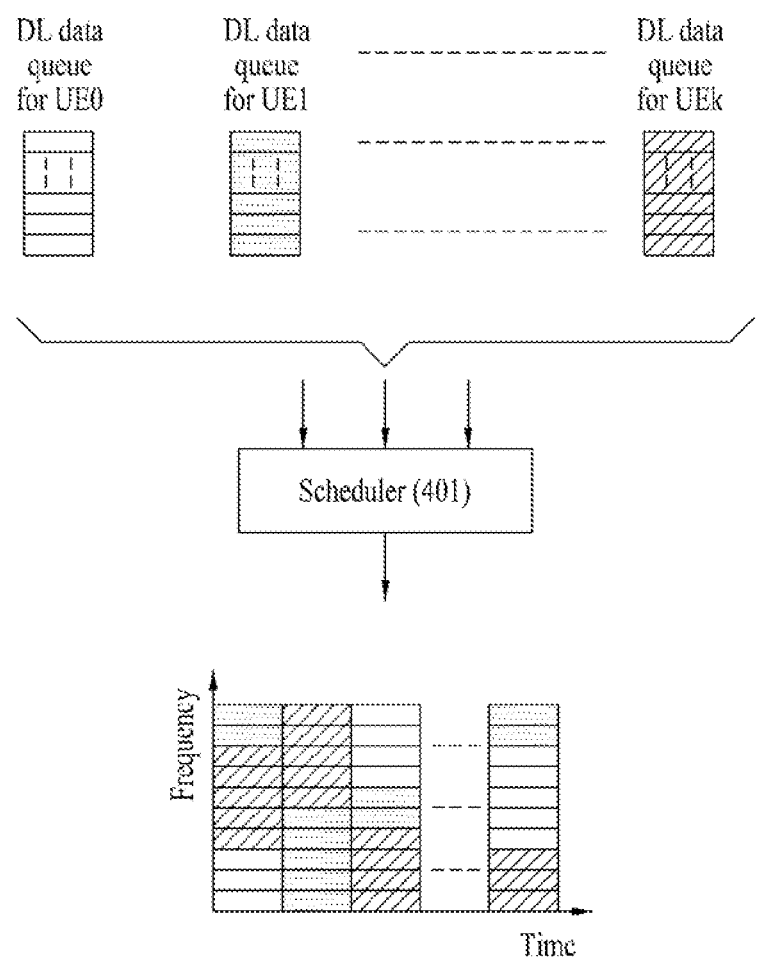
FIG. 6 illustrates a conceptual view showing an example of collectively scheduling data respective to multiple users, in order to perform downlink transmission.

FIG. 6 illustrates a conceptual view showing an example of collectively scheduling data respective to multiple users, in order to perform downlink transmission.

The scheduler (401) may perform scheduling based upon precoding matrix information or feedback information, such as CQI, RI, and so on, which is received from the user equipment so that data of specific users can be collectively transmitted. Referring to FIG. 6, the scheduler (401) may schedule data for user equipment 0 (UE0) to user equipment k (UEk) to the same time/frequency area.

Meanwhile, the scheduler (401) may be configured as an independent module, which is provided to the base station or a control station. Alternatively, a processor (400*b*), which is included in the base station, may be configured to perform the functions of the scheduler (401). It is also possible to equip a control station, which is connected to the base station, with a scheduler (401), so as to transmit scheduling information to the base station. However, for simplicity of the description of the present invention, a case of the processor (400*b*) of the base station including the scheduler (401) will mostly be given as an example of the present invention.

The scheduler (401) may control a transmitter (100*b*) included in the base station, so that the data respective to user equipment 0 (UE0) to user equipment k (UEk) can be collectively mapped to the same time/frequency area. In this case, under the control of the scheduler (401), or under the control of a processor (400*b*), which performs the functions of the scheduler (401), a resource element mapper (305), which is included in the transmitter (100*b*) of the base station, may map data respective to user equipment 0 (UE0) to user equipment k (UEk) to a specific time/frequency area. Additionally, the scheduler (401) according to the exemplary embodiment of the present invention may be configured so as to be capable of selecting user equipments that are to be scheduled together, as well as deciding a number of transmission streams for each of the selected users.

When multiple sets of data, which are allocated to a specific frequency band, are scheduled so as to be transmitted in a specific time interval, it may be indicated that the data are scheduled to the same time/frequency area. For example, when data respective to multiple users are scheduled to the same frame or scheduled to the same slot, or when data respective to multiple users are scheduled to the same resource grid, or when data respective to multiple users are scheduled to the same resource block, or when data respective to multiple users are scheduled to a resource block pair included in a subframe, it may be said that multiple users are scheduled to the same time/frequency area.

As described in FIG. 5, unlike the SU-MIMO, by multiplexing data respective to multiple user equipment in the same time/frequency area, the MU-MIMO may acquire additional gain. When performing MU-MIMO, a co-channel interference may occur due to collectively scheduled user equipments. Herein, the co-channel interference may eventually cause degradation in the performance of the wireless channel. Hereinafter, a method for reducing such co-channel interference, which is proposed herein according to the exemplary embodiment of the present invention, will be described in detail.

Figure 7:
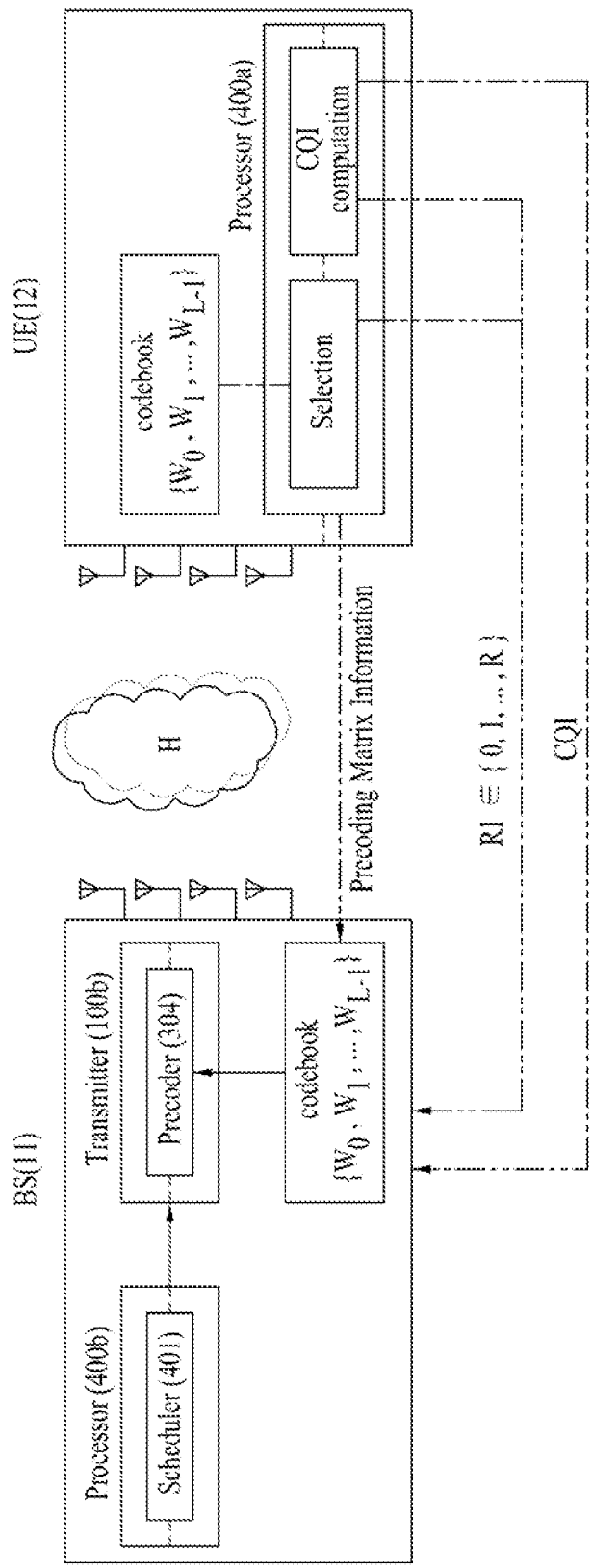
FIG. 7 illustrates an exemplary channel quality adjustment that may be applied in a MIMO according to an embodiment of the present invention.

FIG. 7 illustrates an exemplary channel quality adjustment that may be applied in a MIMO according to an embodiment of the present invention.

A channel matrix H exists between the base station and a specific user equipment (UE). The user equipment estimates the above-described channel matrix H, based upon a Reference Signal (RS) received from the base station. Then, the user equipment generates precoding matrix information, which helps the base station to properly determine a precoding matrix W and feeds-back the generated precoding matrix information to the base station. Additionally, the user equipment may estimate the quality of a channel configured between the base station and the user equipment and a number of transmittable signal streams/layers based on the reference signal and transmit to the base station a CQI (Channel Quality Indicator indicating the quality of the corresponding channel and an RI (Rank Indicator) indicating the number of signal streams that can be simultaneously transmitted by the base station through the channel or the number of layers that can be used for the downlink transmission. For reference, in the current LTE system, two layers may be used for each codeword. Herein, the number of layers may also be identical to the number of MIMO streams. And, therefore, the RI may also indicate the number of streams that can be simultaneously transmitted to the user equipment.

For reference, in determining the precoding matrix W, both the codebook method and the non-codebook method may be used. In case of using the codebook method, it may be advantageous in that the amount) of the feedback information can be reduced, since the precoding matrix is selected based upon a codebook, which is stored in the user equipment and the base station, and since the user equipment actually designates a precoding matrix by feeding-back only the index of the corresponding codebook. Referring to FIG. 7, among the codebook designating 'L' number of precoding matrices, a precoding matrix, which is estimated to minimize the channel interference respective to the user equipment may be selected, and a Precoding Matrix Indicator (PMI) indicating the selected precoding matrix may be transmitted to the base station. The base station may select a precoding matrix W based upon the transmitted PMI. Then, after multiplying the precoding matrix W by the data that are to be transmitted to the user equipment, the multiplied data may be transmitted to the user equipment.

In the MU-MIMO communication, the base station may receive reports on the PMI/RI/CQI from a plurality of user equipments within the coverage of the base station, and the base station may then transmit data for one or more users to the one or more users through the same time/frequency area. Based upon the CQIs reported by the user equipments, the base station may calculate the quality of the channel, which is configured between the base station and each user equipment.

The processor (400*b*) of the base station may select the user equipments that are to be scheduled together, based upon the RIs and/or CQIs, PMIs, and so on, and may also select the number of streams that are to be transmitted. In case the scheduler (401) is provided as a module independent from the processor (400*b*), the channel quality value, which is calculated by the processor (400*b*) and/or the PMIs, RIs, and so on, which are reported by the user equipments, may be used so that the scheduler (401) can be capable of selecting the user equipments that are to be scheduled together and of selecting the number of streams that are to be transmitted.

Additionally, the base station processor (400*b*) may select a precoding matrix W, which is to be applied to the data that are scheduled to be transmitted, based upon the PMIs and RIs reported by the user equipments in case the scheduler (401) exists as a module independent from the processor (400*b*), the processor (400*b*) may use the scheduling information and the PMI/RI, which are received from the scheduler (401), so as to select the precoding matrix W, which is to be applied to the user equipment(s) allocated to a predetermined time/frequency area.

Under the control of the processor (400*b*) and/or the scheduler (401), the resource element mapper (304) of the user equipment may allocate the user data, which are to be transmitted together, to specific resource element(s). An antenna (500*b*) of the transmitter (100*b*) transmits the allocated user data to the collectively scheduled user equipments under the control of the processor (400*b*).

In the exemplary embodiment shown in FIG. 7, each user equipment estimates the respective channel quality by interpreting the reference signal, without considering the channel interference, which is caused by other user equipments being collectively scheduled in the same time/frequency area, and feeds-back the PMI/RI/CQI based upon the estimated channel quality. However, in case data respective to multiple user equipments are multiplexed to the same time/frequency area, each user equipment may interfere with one another, which may then result in a CQI mismatch. More specifically, a mismatch may occur between the CQI, which is transmitted after a user equipment estimated the channel quality without considering the case when another user equipment may be multiplexed to the reference signal, i.e., while assuming that the user equipment is being operated in the SU-MIMO mode, and the CQI corresponding to the actual channel quality of the respective user equipment. The CQI mismatch may lead to a miscalculation in estimating the channel status, when the base station performs downlink transmission. Accordingly, an MCS level adequate for the channel status may not be properly decided. If the base station is incapable of deciding an adequate MCS for the channel status, the reliability of the wireless communication may be degraded, and an overall degradation in the system performance may also occur.

Therefore, hereinafter, referring to FIG. 8 to FIG. 13, exemplary embodiments for minimizing CQI mismatch by feeding-back the multiple CQI to the base station will be described in detail. For reference, the CQIn, which will be hereinafter be mentioned, refers to a channel quality indicator indicating the channel quality corresponding to when n number of streams are allocated to one or more user equipments within the same time/frequency area. Hereinafter, a case when the CQI, which is fed-back by the user equipment, is dependent on the number of streams, will be mostly given as an example, for simplicity. However, the present invention will not be limited only to the example presented above. For example, the user equipment may feed-back the CQI, which depending upon the number of user equipments that may be multiplexed to a certain resource area. In another example, the user equipment may also feed-back the CQI for each codeword. When multiple streams are mapped to one codeword, the user equipment may feed-back an average CQI value respective to the codeword to the base station. When the user equipment feeds-back the CQI for each stream, without feeding-back the average CQI for each codeword, the base station may use the CQI for each stream so as to calculate the average CQI of the corresponding codeword. Based upon the corresponding CQI of the codeword, the base station may select an MCS adequate to the codeword.

Figure 8:
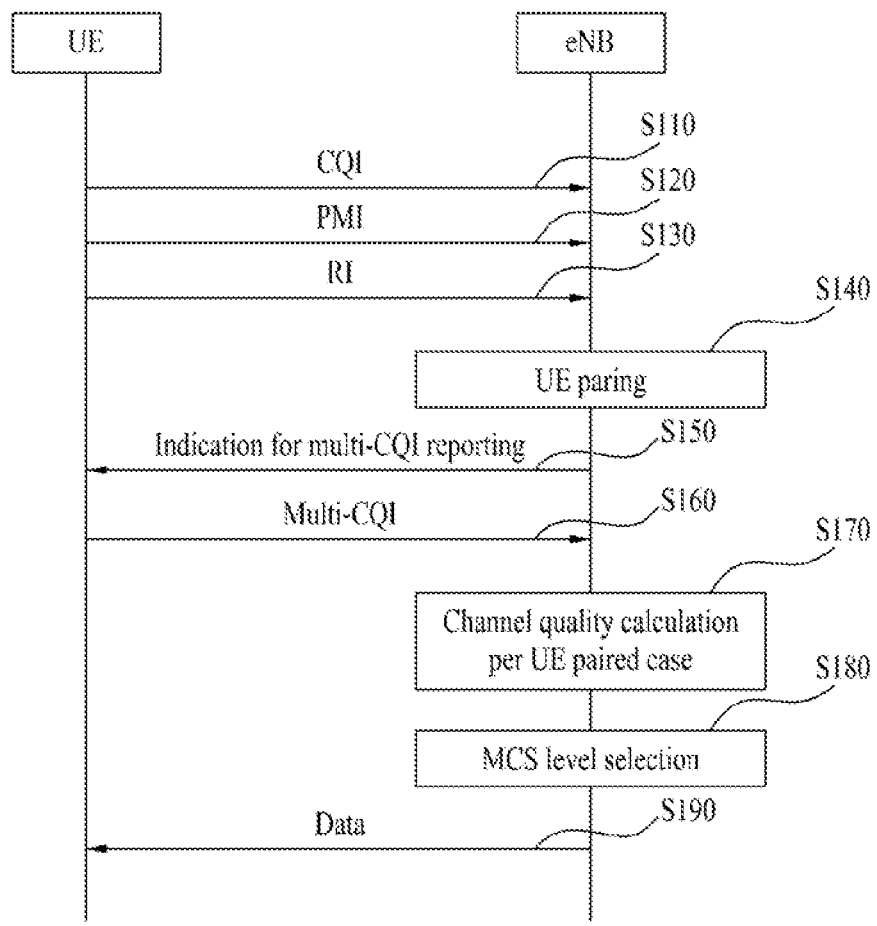
FIG. 8 illustrates a channel quality adjustment according to an exemplary embodiment of the present invention.

FIG. 8 illustrates a channel quality adjustment according to an exemplary embodiment of the present invention.

The base station may estimate channel quality based upon channel quality indication information (e.g., CQI, PMI and/or RI), which is transmitted by the user equipment(s) (S110~S130) within the corresponding coverage, and, based upon the estimated channel quality, the base station may select a user equipment, which is collectively scheduled (S140). The base station may transmit indication information indicating the user equipments, which may be collectively scheduled, to feed-back multiple CQIs (S150).

After receiving the multiple CQI report indication information from the base station, the user equipment may calculate the CQI for each number of user equipments, or the CQI for each number of streams that may be collectively transmitted, or the CQI for each codeword, and may transmit the calculated CQI(s) to the base station (S160). For reference, each CQI value being transmitted to the base station may correspond to a value respective to a case when another user equipment, which is scheduled to the same time/frequency area as the corresponding user equipment, minimizes or maximizes the interference caused by the corresponding user equipment.

After receiving multiple CQIs from each of the user equipment(s) within the corresponding coverage, the base station may calculate the channel quality (S170) for each combination of user equipments, for each combination of streams, or for each combination of codewords, allocated together to the same time/frequency area, i.e., the same resource area, based upon the multiple CQIs. For example, when it is assumed that only one stream is allocated to each codeword and that a CQI is transmitted for each stream, for each one stream combination, the channel quality may be calculated based upon CQI1, among the multiple CQIs transmitted from each user equipment. And, for the combination of 2 streams, the channel quality for each corresponding combination may be calculated by using an equation for calculating channel quality based upon CQI2, among the multiple CQIs transmitted from each user equipment.

The base station may select an MCS level (S180), based upon the best channel quality corresponding to a combination of user equipments and/or based upon the channel quality corresponding to a combination of streams (S180). And, the base station may modulate data by applying a modulation order and coding rate in accordance with the selected MCS level and may, then, transmit the modulated data to the user equipments belonging to the corresponding combination (S190).

The antenna (500*a*) of the user equipment receives a downlink signal from the base station. The antenna (500*a*) provides the receiver (300*a*) of the user equipment with the received signal. The receiver (300*a*) acquires a sample by processing (e.g., filtering, amplifying, down-converting, and digitalizing) the received signal, and the receiver (300*a*) also acquires the received downlink symbol by demodulating and modulating the sample signal. Additionally, the receiver (300*a*) may detect downlink data from the downlink symbol, may process (e.g., symbol de-mapping, de-interleaving, decoding, and so on) a downlink data symbol estimation value, and may provide the processed downlink signal to the processor (100a) of the user equipment. The processor (100a) may interpret the multiple CQI report indication information from the processed downlink signal. Based upon the multiple CQI report indication information, the processor (100a) processor (400a) may calculate the CQI respective to the number of user equipments that may be collectively scheduled, or respective to a number of streams that may be collectively transmitted, or respective to codewords that may be collectively transmitted. Then, the processor (100a) may control the corresponding transmitter (100a) and the antenna (500a), so as to transmit the calculated CQI(s) to the base station.

The antenna (500b) of the base station receives an uplink signal from the user equipments within the corresponding coverage. The antenna (500b) provides the uplink signal to the receiver (300b) of the base station. The receiver (300b) acquires a sample by processing the received signal, and the receiver (300b) also acquires an uplink symbol by demodulating and modulating the sample signal. Additionally, the receiver (300b) may detect uplink data from the uplink symbol, may process the uplink data symbol estimation value, and may provide the processed value to the processor (400b) of the base station. The processor (400b) may acquire the multiple CQI from the processed uplink signal. Based upon the multiple CQI, the base station processor (400b) may calculate the channel quality for each combination of user equipments, or combination of streams or combination of codewords, which are collectively allocated to the same time/frequency area, i.e., the same resource area, based upon the corresponding CQI among the multiple CQIs.

The base station processor (400b) may select an MCS level (S180), based upon the best channel quality corresponding to a combination of user equipments and/or corresponding to a combination of streams and/or corresponding to a combination of codewords (S180). And, the base station may control the transmitter (100b) of the base station, so that data can be modulated by applying a modulation order and coding rate in accordance with the selected MCS level and so that the modulated data can be transmitted to the user equipments belonging to the corresponding combination. Under the control of the base station processor (100b), a modulation mapper (302) of the base station modulates data that are to be transmitted in accordance with the selected MCS level. And, under the control of the base station processor (100b), a resource mapper (305) of the base station maps the data that are to be transmitted to a resource area. An OFDM generator (306) of the base station converts the mapped data to an OFDM signal, and the OFDM signal is transmitted to the corresponding user equipments through the antenna (500b) of the base station.

For reference, an example wherein the base station estimates channel quality of each user equipment and selects the user equipments that are to be collectively scheduled (S140), based upon the CQI, PMI, RI (S110-S130) transmitted from user equipments, has been given to describe this embodiment of the present invention. However, the selection of the user equipments to which MU-MIMO is to be applied merely corresponds to an issue of implementing the base station. Therefore, user equipments that are to be collectively scheduled, or streams that are to be collectively scheduled, or codewords that are to be collectively transmitted may be selected by using different methods. For example, after estimating the channel status based upon the uplink signal, the base station may also transmit the multiple CQI report indication information, which will be described in more detail later on, based upon the estimated channel status.

Meanwhile, the multiple CQI report indication information may be defined in diverse formats, and diverse CQI reporting formats and/or modes may be defined accordingly. The available implementation examples will hereinafter be described in detail.

Multiple CQI Report Indication Information Implementation Example 1: Reference Rank As indication information for performing multiple CQI report, the base station may transmit reference rank information, which indicates the maximum rank, to the user equipment. Herein, the reference rank may refer to a maximum number of user equipments that can be collectively scheduled or a maximum number of streams that can be collectively transmitted. For example, when only one stream is being used for each user equipment, the reference rank may indicate the maximum number of user equipments that can be collectively scheduled. And, in another example, when one or more streams are used in one user equipment, the reference rank may indicate the maximum number of streams that can be collectively transmitted.

The user equipment, which has received the reference rank information from the base station, may estimate channel quality for each number of user equipments that can be collectively scheduled, or for each number of streams that can be collectively transmitted, or for each number of codewords that can be collectively transmitted, so as to calculate multiple CQIs, and the user equipment may then transmit the multiple CQIs to the base station. For example, when it is assumed that the multiple CQIs are being transmitted to the base station for each number of streams, a user equipment having received reference rank information indicating that the reference rank corresponds to 1 may transmit CQI1 to the base station, wherein CQI1 corresponds to a channel quality indicator respective to a case when 1 stream is being allocated to the same time/frequency area. Then, a user equipment having received the reference rank information indicating that the reference rank corresponds to 2 may further transmit CQI 2, and a user equipment having received the reference rank information indicating that the reference rank corresponds to 3 may further transmit CQI 2 and CQI3, a user equipment having received the reference rank information indicating that the reference rank corresponds to 4 may further transmit CQI 2 and CQI3, CQI4. Thus, multiple CQIs may be transmitted to the base station.

Multiple CQI Report Indication Information Implementation Example 2: Number of CQI Reports As indication information for performing multiple CQI report, the base station may notify information indicating a maximum number of CQIs that can be reported to the user equipment. In this case, the base station and the user equipment may share a format, which is pre-decided with respect to the corresponding number of CQI reports. And, the user equipment may calculate the corresponding CQI value in accordance with the CQI report and the pre-decided format and may transmit the calculated CQI value to the base station.

For example, as shown in Table 1, it will be assumed that a number of CQIs, which are to be reported with respect to the maximum number of CQIs, is pre-decided. For example, if the base station transmits information indicating that the number of CQI reports is equal to 2 to the user equipment, the user equipment may feed-back CQI1 and CQI4 to the base station, in accordance with the format shown below in Table 1. And, after receiving information indicating that the number of CQI reports is equal to 3, the user equipment may feed-back CQI1 and CQI2, CQI3, CQI4 to the base station.

TABLE 1

| | Maximum number of CQIs | | | |
|---|---|---|---|---|
| | 1 | 2 | 3 | 4 |
| CQIs | CQI1 | CQI1, CQI4 | CQI1, CQI2, CQI4 | CQI1, CQI2, CQI3, CQI4 |

For reference, when a CQI corresponding to a case when one user equipment/stream/codeword is being scheduled, i.e., when CQI1 is already reported, the base station may also transmit information indicating a number of CQIs, which can be additionally reported, to the user equipment. For example, in accordance with a pre-decided format between the user equipment and the base station, as shown below in Table 2, the user equipment may transmit additional CQI(s) to the base station. More specifically, when the base station designates the number of CQI reports to 1 and informs the user equipment of the designated number of CQI reports, the user equipment may transmit CQI2 to the base station as a response to the received number of CQI reports. In another example, when the user equipment received 2 CQI reports, the user equipment may transmit CQI2 and CQI4 to the base station.

TABLE 2

| | Maximum number of additional CQIs | | |
|---|---|---|---|
| | 1 | 2 | 3 |
| CQIs | CQI2 | CQI2, CQI4 | CQI2, CQI3, CQI4 |

According to the examples shown in Table 1 or Table 2, after receiving CQI1 and CQI4, when 1 user equipment or 2 user equipments are collectively scheduled, the base station may calculate the channel quality based upon CQI1 so as to select the MCS level. And, when 3 user equipments or 4 user equipments are collectively scheduled, the base station may calculate the channel quality based upon CQI so as to select the MCS level.

Multiple CQI Report Indication Information Implementation Example 3: Reference Rank+Number of CQI Reports When the base station pre-decides a format corresponding to reference rank information indicating the reference rank of a channel and a format corresponding to number CQI reports information indicating the number of CQIs that can be reported, and when the base station indicates such two values to the user equipment, a report format for multiple CQIs may be defined. For example, when the base station indicates the reference rank as 4 and the number of CQI reports as 3 to the user equipment, the user equipment may transmit CQI1 and CQI2, CQI4 to the base station, as shown in Table 1.

In another example, when a format for reference rank 3 between the base station and the user equipment is pre-decided as shown in Table 3, and when the base station indicates the reference rank as 3 and the number of CQI reports as 2 to the user equipment, the user equipment may transmit CQI1 and CQI2, CQI3 to the base station, as shown in Table 3.

TABLE 3

| | Maximum number of CQIs | |
|---|---|---|
| | 2 | 3 |
| CQIs | CQI1, CQI2 | CQI1, CQI2, CQI3 |

Multiple CQI Report Indication Information Implementation Example 4: Best Reference Rank The implementation examples 1 to 3 of the multiple CQI report indication correspond to the same cell-specific information for all user equipments within the cell. Alternatively, when the base station notifies a specific user equipment of a rank, to which a largest number of user equipments have been scheduled for a predetermined period of time, for example, when the base station notifies the specific user equipment of information indicating a number of streams or number of user equipments or number of codewords being allocated to the same time/frequency area, the specific user equipment may calculate the corresponding CQI and may transmit the calculated CQI to the base station. More specifically, the base station may transmit a reference rank, which is estimated to be the best reference rank for the user equipment, to the corresponding base station.

For example, when a specific user equipment has most frequently received 3 streams in the same time/frequency area during a predetermined period of time, the base station may transmit information indicating that the reference rank corresponds to 3 to the user equipment. After receiving the corresponding information, the specific user equipment may assume that 3 streams will be multiplexed and may calculate CQI3 based upon the assumption and may transmit the calculated CQI3 to the base station. For reference, when the user equipment feeds-back a CQI for each codeword to the base station and when multiple streams may be mapped for each codeword, a number of CQIs less than 3 may be fed-back to the base station.

Multiple CQI Report Indication Information Implementation Example 5: Best Reference Rank+Second Best Reference Rank Meanwhile, the base station may also transmit a second best reference rank to the user equipment along with the best reference rank. More specifically, the best reference rank, which corresponds to a rank (e.g., a number of streams or a number of user equipments or a number of codewords being allocated to the same time/frequency area) that is most frequently scheduled to a specific user equipment for a predetermined period of time, and information on the second best reference rank, which corresponds to a rank that is second most frequently scheduled to the specific user equipment, may be collectively transmitted to the user equipment. The specific user equipment may calculate the CQI corresponding to the best reference rank and the second best reference rank and may transmit the calculated CQIs to the base station. For reference, the base station may also transmit the second best reference rank in the form of an offset value respective to best reference rank to the specific user equipment.

For example, under the assumption that the user equipment feeds-back the CQI for each stream, when a specific user equipment receives 3 streams most frequently in the same time/frequency area during a predetermined period of time and then receives 2 streams second-most frequently, the base station may collectively transmit a best reference rank information indicating that the reference rank is equal to 3 and a second-best reference rank information indicating that the reference rank is equal to 2. After receiving the best reference rank information and the second-best reference rank information, the specific user equipment may collectively transmit CQI3, which is calculated under the assumption that the 3 streams will be multiplexed, and CQI2, which is calculated under the assumption that the 2 streams will be multiplexed, to the base station.

The processor (400*b*) of the base station according to the exemplary embodiment of the present invention may be configured to execute at least any one of the above-described implementation examples. More specifically, the base station processor (400b) that can perform MU-MIMO may generate multiple CQI report indication information in accordance with at least one of the above-described implementation examples, and may control the transmitter (100b) of the base station so that the generated multiple CQI report indication information can be broadcast or multicast to multiple user equipments which can be collectively scheduled.

The processor (400a) of the user equipment may be configured to process the multiple CQI report indication information according to the at least one of the above-described implementation examples and to generate multiple CQIs as a response to the processed information. More specifically, as a response to the multiple CQI report indication information transmitted from the base station, the processor (400a) may generate multiple CQIs in accordance with at least one of the above-described implementation examples, and the processor (400a) may also be configured to control the transmitter (100a) of the user equipment, so as to transmit the generate multiple CQI.

The processor (100b) of the base station may be configured to select the best MCS level by using the multiple CQIs fed-back by the user equipment. Additionally, the base station processor (100b) may also control the modulation mapper (302), so that the data of the user equipments, which are scheduled to simultaneously transmit downlink signals, in accordance with the modulation order and coding rate of the selected MCS level.

Meanwhile, the base station processor (100b) may be configured to select the user equipments that are to participate in the MU-MIMO communication by using the multiple CQI. More specifically, the base station processor (400b) may be configured to be capable of deciding which user equipments, among the multiple user equipments existing within the corresponding coverage, are to be grouped in order to transmit data in the MU-MIMO format.

For reference, when the scheduler (401) is provided as a module independent from the base station processor (400b), based upon the information fed-back from the user equipments, the scheduler (401) may schedule the user equipments. More specifically, the scheduler (401), which is connected to the base station processor (400b) so as to co-operate with the base station processor (400b), may decide which user equipments within the specific time/frequency area are to participate in the MU-MIMO communication. Based upon the fed-back information, the base station processor (400b) may control the data transmission to the user equipments, which are scheduled by the scheduler (401). An example wherein the base station processor (400b) or the scheduler (401) uses the multiple CQIs, so as to select the user equipments that are to be applied to the MU-MIMO communication will be described later on in more detail with reference to FIG. 10 and FIG. 11.

Figure 9:
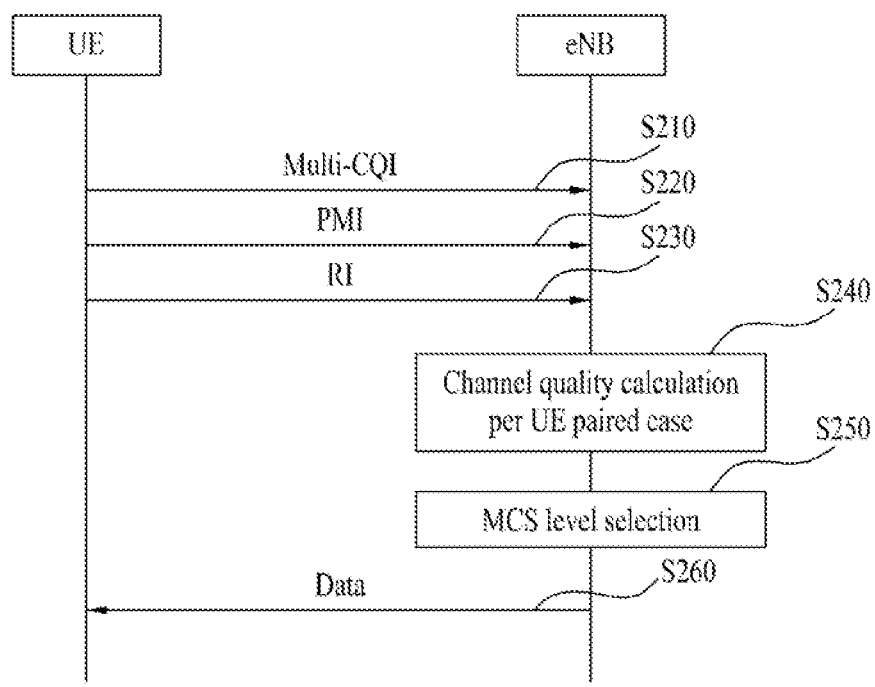
FIG. 9 illustrates a channel quality adjustment according to another exemplary embodiment of the present invention.

FIG. 9 illustrates a channel quality adjustment according to another exemplary embodiment of the present invention.

Referring to FIG. 9, based upon the reference signal transmitted from the base station, the user equipment may calculate the CQI for each rank, while using an estimated rank estimated by the user equipment as the standard rank, without waiting for the multiple CQI report from the base station, and the user equipment may then transmit the calculated CQIs to the base station (S210). The one or more CQIs may also be collectively transmitted to the base station along with the PMI and the corresponding rank information (S220-S230).

For example, once a user equipment has estimated, based upon the reference signal, that the maximum number of downlink streams capable of being simultaneously received is equal to 4, the corresponding user equipment may transmit CQI1 as well as CQI2 and CQI3, CQI4 to the base station. For reference, when a number of CQIs equivalent to the estimated rank is fed-back to the base station, since the number of CQIs reported to the base station connotes the channel rank of the corresponding user equipment, the step of transmitting the RI (S230) may be omitted. However, when mapping multiple streams to each codeword and when the CQI per codeword is fed-back to the base station, the number of reported CQIs may be less than the number of RIs. Therefore, the step of transmitting the RI (S230) cannot be omitted.

When a base station receives the PMI or RI and the multiple CQIs from each user equipment existing in the corresponding coverage, the corresponding base station may estimate the channel quality based upon the PMI or RI, CQI and so on. And, based upon the estimated channel quality, the base station may also select a combination of user equipment(s), stream(s) and/or codeword(s) that can be collectively scheduled to the same time/frequency area, i.e., the same resource area. Additionally, based upon the corresponding CQI among the received multiple CQIs, the base station may calculate channel quality (S240) for each combination of user equipment(s) and/or stream(s) or for each combination of user equipment(s) and/or codeword(s). For example, when it is assumed that only one stream is mapped for each codeword and that a CQI is fed-back for each stream, the channel quality for each combination may be calculated by using a method of calculating the channel quality for a combination of 1 stream based upon CQI1, among the multiple CQIs transmitted by each user equipment, and by using a method of calculating the channel quality for a combination of 2 streams based upon CQI2, among the multiple CQIs transmitted by each user equipment.

Among the multiple channel qualities, which are calculated as described above, the base station may select an MCS level (S250), based upon a combination of user equipments corresponding to the best channel quality and/or a combination of the streams or codewords, which are/is corresponding to the best channel quality. And, by applying the modulation order and coding rate of the selected MCS level, the base station may modulate data of the corresponding codeword and may transmit the modulated data to the user equipments belonging to the corresponding combination (S260).

Based upon the reference signal transmitted from the base station, the processor (400a) of the user equipment may calculate the CQI for each rank, while using an estimated rank estimated by the user equipment as the standard rank, without waiting for the multiple CQI report request from the base station. And, the user equipment processor (400a) may control the corresponding transmitter (100a) and antenna (500a), so that the calculated CQIs can be fed-back to the base station. Additionally, the processor (100a) may generate a PMI and the corresponding RI and may control the transmitter (100a) and the antenna (500a), so as to transmit the PMI/RI to the base station.

The antenna (500b) of the base station receives an uplink signal from the user equipments within the corresponding coverage. The base station antenna (500b) provides the uplink signal to the receiver (300b) of the base station. The receiver (300b) acquires a sample by processing the received signal, and the receiver (300b) also acquires an uplink symbol by modulating the sample signal. The receiver (300b) may detect uplink data from the uplink symbol, may process the uplink data symbol estimation value, and may provide the received feedback information to the processor (400b) of the base station. The base station processor (400b) or the scheduler (401), which operates while being connected to the base station processor (400*b*), may estimate the channel quality based upon feedback information, e.g., the PMI or RI, and the multiple CQIs. And, based upon the estimated channel quality, the base station processor (400*b*) may also select a combination of user equipment(s), stream(s) and/or codeword(s) that can be collectively scheduled to the same time/frequency area, i.e., the same resource area. Additionally, based upon the corresponding CQI among the received multiple CQIs, the base station may calculate channel quality (S240) for each combination of user equipment(s), stream(s), and/or codeword(s). For example, when it is assumed that only one stream is mapped for each codeword and that a CQI is fed-back for each stream, the channel quality for each combination may be calculated by using a method of calculating the channel quality for a combination of 1 stream based upon CQI1, among the multiple CQIs transmitted by each user equipment, and by using a method of calculating the channel quality for a combination of 2 streams based upon CQI2, among the multiple CQIs transmitted by each user equipment.

Among the multiple channel qualities, which are calculated as described above, the base station processor (400*b*) may select an MCS level, based upon the corresponding user equipment combination corresponding to the best channel quality and/or a channel quality corresponding the streams combination and/or codewords combination. Additionally, the base station processor (400*b*) may control the modulation mapper (302) of the base station, so that the base station can modulate data of the corresponding codeword by applying the modulation order and coding rate of the selected MCS level. And, the base station processor (400*b*) may also control the resource element mapper (305) of the base station, so that the base station can transmit the modulated data to a predetermined resource element. Additionally, the base station processor (400*b*) may control the OFDM signal generator (306) of the base station, so that the base station can process (e.g., conversion to analog data, filtering, amplification, up-converting, and so on) the resource element, to which the data are allocated, and so that the downlink OFDM signal can be generated. Based upon the control of the base station processor (400*b*), the antenna (500*b*) of the base station may transmit the OFDM signal to the user equipments belonging to the corresponding combination.

For reference, regardless of the method according to which the base station has selected a combination of the user equipment(s) and/or stream(s), the user equipment receive the data allocated to the specific time/frequency area, in accordance with the combination of user equipment(s) and stream(s). Therefore, the issue of how the base station selects the user equipments participating in the MU-MIMO communication or the issue of how many streams are to be allocated for each user equipment is merely a matter of implementation. More specifically, selecting the number of user equipments that are to be collectively scheduled, or selecting the number of streams for each user equipment may vary depending upon the respective base station. Nevertheless, for reference, among the diverse methods for selecting user equipments that are to be collectively scheduled, from the multiple user equipments existing in the base station, a method for selecting multiple user equipments by using multiple CQIs according to an exemplary embodiment of the present invention will hereinafter be described in detail with reference to FIG. 10.

FIG. 10 and FIG. 11 illustrate examples for describing a process for selecting multi user equipments.

The method for selecting multiple user equipments of FIG. 10 and FIG. 11 may be applied to all of the embodiments shown in FIG. 7 to FIG. 9. Hereinafter, a channel information indicator corresponding to a case when y number of streams, which is transmitted from user equipment x, is allocated to the same time/frequency area under an MU-MIMO environment, will be expressed CQIx,y and described accordingly. Although the exemplary embodiment of the present invention will be described under the assumption that the CQI is being fed-back for each stream, for simplicity of the description, the method described herein may be equally applied to cases corresponding to CQI feedback for each codeword or CQI feedback for each user equipment. FIG. 10 illustrates an example corresponding to a case of ranks corresponding to the respective channel of each user equipment and CQI transmitted to the base station by each user equipment ranging from user equipment 1 to user equipment 4.

FIG. 10 shows an example when each user equipment transmits a number of CQIs equivalent to the respective rank to the base station. However, as described above in the multiple CQI report implementation examples, based upon a reference standard, which is pre-decided between the base station and the user equipment, the number of transmitted CQIs may be different from the respective rank. Additionally, the rank may be estimated by the user equipment from a reference signal, which is transmitted by the base station, and the base station may transmit the rank to the user equipment in the format of the multiple CQI report indication information. This has already been described above with reference to FIG. 8 and FIG. 9.

Referring to FIG. 11, the base station processor (400*b*) may calculate a Channel Quality (CQ) of a corresponding user equipment for each number of stream, based upon the CQIs transmitted from user equipment 1 (UE1) to user equipment 4 (UE4). For simplicity of the description, FIG. 11 shows an example of a case when one stream is allocated for each user equipment. However, the example of FIG. 11 may also be equally applied to a case when multiple streams are allocated to each user equipment.

In FIG. 11, CQIx corresponds to a channel quality value respective to a case when only user equipment x is being scheduled to the same time/frequency area, and CQIx,y corresponds to a channel quality value respective to a case when user equipment x and user equipment y are collectively scheduled to the same time/frequency area. And, CQIx,y,z corresponds to a channel quality value respective to a case when user equipment x, user equipment y, and user equipment z are collectively scheduled to the same time/frequency area. Finally, And, CQIx,y,z,w corresponds to a channel quality value respective to a case when user equipment x, user equipment y, user equipment z, and user equipment w are collectively scheduled to the same time/frequency area.

For example, in case the stream of user equipment 1 is multiplexed to a specific time/frequency area, the base station processor (400*b*) or the scheduler (401), which is connected to the base station, calculates CQ1 based upon CQI1,1. And, in case the stream of user equipment 1 and the stream of user equipment 2 are multiplexed to a specific time/frequency area, the base station processor (400*b*) or the scheduler (401), which is connected to the base station, may calculate CQ1 based upon CQI1,2, which is fed-back from user equipment 1 and may calculate CQ1,2 based upon CQI2,2, which is fed-back from user equipment 2. Similarly, the base station processor (400*b*) or the scheduler (401), which is connected to the base station, may calculate the channel quality for each user equipment combination, and this may be illustrated as shown in FIG. 11.

Since user equipment 1 may receive up to 4 streams, user equipment 1 may receive data having streams of user equipment 2 (UE2) and user equipment 3 (UE3), and user equipment 4 (UE4) multiplexed therein. However, since the rank of user equipment 2 is equal to 2, and since the rank of user equipment 2 is equal to 1, among many combinations wherein data respective to 3 user equipments or 4 user equipments are being multiplexed therein, a combination including user equipment 2 and user equipment 4 cannot be selected. Additionally, among many combinations wherein data respective to 2 user equipments are being multiplexed therein, a combination including user equipment 4 cannot be selected. When applying the same principle, any one of combinations transmitting a signal only to one of the 4 user equipments, a combination having the streams respective to user equipment 1 and user equipment 2 multiplexed therein, a combination having the streams respective to user equipment 1 and user equipment 3 multiplexed therein, and a combination having the streams respective to user equipment 2 and user equipment 3 multiplexed therein, may be selected. Among the above-described combinations, when the channel quality CQ2,3 respective to the combination of user equipment 2 and user equipment 3 is considered to be the best channel quality, the base station processor (400*b*) may select an MCS level based upon CQ2,3. Based upon the control of the base station processor (400*b*), the transmitter (100*b*) of the base station may modulate data of user equipment 2 and data of user equipment 3, by applying the modulation order and coding rate respective to the selected MCS level, and may transmit the modulated data to user equipment 2 and user equipment 3 from a specific time/frequency area. More specifically, under the control of the base station processor (400*b*), the modulation mapper (302) of the base station may modulate the data of user equipment 2 and user equipment 3 in accordance with the selected MCS level. Under the control of the base station processor (400*b*), the resource element mapper (305) of the base station may map the data of user equipment 2 and user equipment 3 to certain resource element(s), and the OFDM signal generator (306) of the base station may process the data mapped to the certain resource element(s) and generates a downlink signal. The base station processor (400*b*) may control the antenna (500*b*) of the base station, so that the downlink signal can be transmitted to user equipment 2 and user equipment 2.

Figure 12:
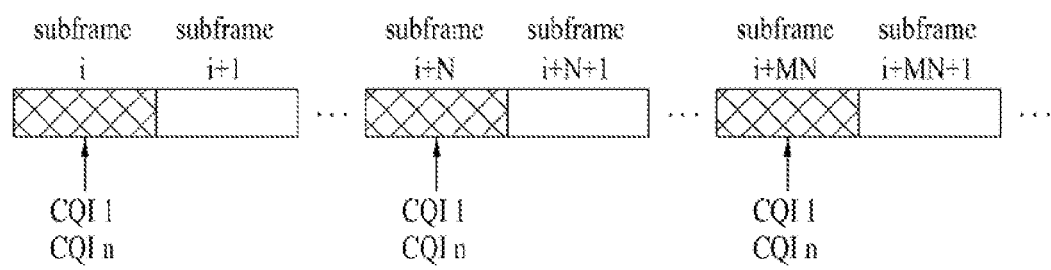
FIG. 12 and FIG. 13 illustrate partial embodiments of a time point at which the user equipment feeds-back a CQI to the base station.
Figure 13:
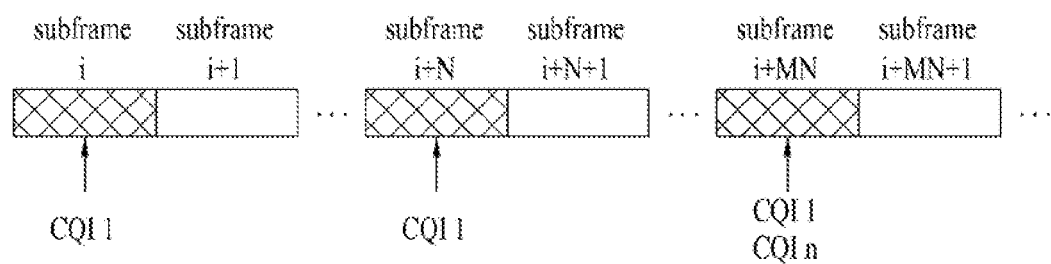

FIG. 12 and FIG. 13 illustrate partial embodiments of a time at which the user equipment feeds-back a CQI to the base station.

Referring to FIG. 12, the user equipment transmits CQI1 to the base station.

However, CQIn, which is used for the channel quality calculation in a case when CQIs other than CQI1, i.e., when at least one or more user equipments are scheduled to the same time/frequency area, may be transmitted to the base station along with CQI1 at the same period as that of CQI1. The processor (400*a*) of the user equipment may control the corresponding transmitter (100*a*) so that the CQIn can be transmitted along with CQI1. Under the control of the processor (400*a*), the resource element mapper (305) may be configured to allocate CQIn to a certain resource element(s) along with CQI1.

Referring to FIG. 13, the transmission cycle period of CQI1 and the transmission period of CQIn may be varied. As shown in FIG. 13, CQI1 may be transmitted at a period N, and CQIn may be transmitted at a period MN. The processor (400*a*) of the user equipment may control the transmitter (100*a*) of the user equipment, so that CQIn can be transmitted at a transmission period other than that of CQI1. Based upon the control of the processor (400*a*), the resource element mapper (305) of the user equipment may be configured so that CQIn can be mapped to the subframe at a transmission period other than that of CQI1.

Additionally, when indication information requesting multiple CQIs to be reported has been sent from the base station, the user equipment may feedback the CQIn to the base station as a response to the received indication information. As described in the exemplary embodiment shown in FIG. 8, the processor (400*a*) of the user equipment may generate CQIn in response to the multiple CQI report indication, which is received from the base station, and, then, the processor (400*a*) may control the transmitter (100*a*) so that the generated CQIn can be transmitted.

Furthermore, the user equipment set up the same transmission band for CQI1 and CQIn, and the user equipment may also set up different transmission bands for CQI1 and CQIn. The processor (400*a*) of the user equipment may also transmit the transmitter (100*a*) so that CQI1 and CQIn can be mapped to different transmission bands. Based upon the control of the processor (400*a*), the resource element mapper (305) of the transmitter (100*a*) may map CQI1 and CQIn to different transmission bands. For example, both CQI1 and CQIn may be transmitted to the base station in a subband feedback format, and both CQI1 and CQIn may also be transmitted in a wideband feedback format. Moreover, CQI1 may also be transmitted in the wideband feedback format, and CQIn may be transmitted in the subband feedback format.

The transmission time point of the above-described CQIn may be applied to all exemplary embodiments related to the above-described multiple CQI reporting.

The exemplary embodiments of the present invention may contribute to the increase in the overall system throughput and the enhancement in the wireless communication system efficiency, by reducing the difference range between the estimated channel quality and the actual channel quality.

As described above, the detailed description of the present invention are provided herein so that anyone skilled in the art can implement and realize the embodiments of the present invention. Although the preferred embodiments of the present invention have been disclosed and described herein, the present invention may be realized in another concrete configuration without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon the understanding and interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

The present invention may be applied to wireless communication systems. And, more specifically, in wireless communication systems, the present invention may be applied to base stations and user equipments.

What is claimed is:
1. A method for transmitting channel quality indication information by a user equipment (UE) among a plurality of UEs in a wireless communication system, the plurality of UEs capable of simultaneously receiving signals transmitted from a base station (BS), the method comprising:
- receiving a reference signal from the BS;
- generating channel quality indication information indicating a channel quality of the UE estimated based on the reference signal; and
- transmitting the generated channel quality indication information to the BS,
- wherein the channel quality indication information includes at least one channel quality indicator calculated assuming that multiple UEs are allocated to a resource area and based on a number of the multiple UEs,
- wherein the method further comprises receiving information indicating a maximum number of channel quality indicators, and
- wherein the number of the multiple UEs is predetermined according to the maximum number of channel quality indicators.

2. The method of claim 1, further comprising:
- receiving information indicating a maximum number of UEs allocated to the resource area,
- wherein the channel quality indication information further includes channel quality indicators calculated according to numbers of UEs from one to the maximum number of UEs.

3. The method of claim 2,
- wherein the number of the multiple UEs is predetermined according to the maximum number of UEs and the maximum number of channel quality indicators.

4. The method of claim 1, further comprising:
- receiving information indicating a first rank used most for the UE during a predetermined time period,
- wherein the channel quality indication information further includes a channel quality indicator calculated based on a first number of UEs corresponding to the first rank.

5. The method of claim 4, further comprising:
- receiving information indicating a second rank used second most for the UE during the predetermined time period,
- wherein the channel quality indication information further includes a channel quality indicator calculated based on a second number of UEs corresponding to the second rank.

6. A user equipment (UE) transmitting channel quality indication information in a wireless communication system in which a plurality of UEs are capable of simultaneously receiving signals transmitted from a base station (BS), the UE comprising:
- a receiver configured to receive signals from the BS;
- a transmitter configured to transmit signals to the BS;
- a processor configured to:
- control the receiver to receive a reference signal transmitted from the BS;
- generate channel quality indication information indicating a channel quality of the UE estimated based on the reference signal; and
- control the transmitter to transmit the generated channel quality indication information to the BS,
- wherein the channel quality indication information includes at least one channel quality indicator calculated assuming that multiple UEs are allocated to a resource area and based on a number of the multiple UEs,
- wherein the processor is further configured to control the receiver to receive information indicating a maximum number of channel quality indicators, and
- wherein the number of the multiple UEs is predetermined according to the second maximum number of channel quality indicators.

7. The user equipment of claim 6, wherein:
- the processor is further configured to control the receiver to receive information indicating a maximum number of UEs allocated to the resource area by the BS; and
- the channel quality indication information further includes channel quality indicators calculated according to numbers of UEs from one to the maximum number of UEs.

8. The user equipment of claim 7, wherein
- the number of the multiple UEs is predetermined according to the maximum number of UEs and the maximum number of channel quality indicators.

9. The user equipment of claim 6, wherein the processor is further configured to control the receiver to receive information indicating a first rank used most for the UE during a predetermined time period,
- wherein the channel quality indication information includes a channel quality indicator calculated based on a first number of UEs corresponding to the first rank.

10. A method for transmitting data by a base station (BS) in a wireless communication system, the BS capable of simultaneously transmitting signals to a plurality of user equipments (UEs), the method comprising:
- calculating channel quality for each combination of UEs to be allocated to a resource area, the channel quality calculated based on channel quality indication information received from each of the plurality of UEs;
- selecting a combination of UEs having a best channel quality;
- modulating and encoding data of UEs belonging to the selected combination according to an MCS (modulation and coding scheme) selected based on the best channel quality; and
- transmitting the modulated and encoded data to the UEs belonging to the selected combination,
- wherein the channel quality indication information of each of the plurality of UEs includes at least one channel quality indicator calculated assuming that multiple UEs are allocated to the resource area and based on a number of the multiple UEs,
- wherein the method further comprises transmitting information indicating a maximum number of UEs allocated to the resource area and information indicating a maximum number of channel quality indicators, and
- wherein the number of the multiple UEs is predetermined according to the maximum number of UEs and the maximum number of channel quality indicators.

11. The method of claim 10, further comprising:
- transmitting information indicating a first maximum number of UEs allocated to the resource area and information indicating a second maximum number of channel quality indicators,
- wherein the number of the multiple UEs is predetermined according to the first maximum number of UEs and the second maximum number of channel quality indicators.

12. The method of claim 10, further comprising:
- transmitting information indicating a first rank used most for the UE during a predetermined time period,
- wherein the channel quality indication information includes a channel quality indicator calculated based on a first number of UEs corresponding to the first rank.

13. The method of claim 12, further comprising:
- transmitting information indicating a second rank used second most for the UE during the predetermined time period, wherein the channel quality indication information further includes a channel quality indicator calculated based on a second number of UEs corresponding to the second rank.

14. A base station (BS) capable of simultaneously transmitting signals to a plurality of user equipments (UEs) in a wireless communication system, the base station comprising:
 a receiver configured to receive signals from the plurality of UEs;
 a transmitter configured to transmit signals to the plurality of UEs;
 a processor configured to:
 calculate channel quality for each combination of UEs to be allocated to a resource area, the channel quality calculated based on channel quality indication information received from each of the plurality of UEs;
 select a combination of UEs having a best channel quality;
 modulate and encode data of UEs belonging to the selected combination according to an MCS (modulation and coding scheme) selected based on the best channel quality; and
 control the transmitter to transmit the modulated and encoded data to the UEs belonging to the selected combination,
 wherein the channel quality indication information of each of the plurality of UEs includes at least one channel quality indicator calculated assuming that multiple UEs are allocated to the resource area and based on a number of the multiple UEs,
 wherein the processor is further configured to control the transmitter to transmit information indicating a maximum number of UEs allocated to the resource area and information indicating a maximum number of channel quality indicators, and
 wherein the number of the multiple UEs is predetermined according to the maximum number of UEs and the maximum number of channel quality indicators.

15. The base station of claim 14, wherein the processor is further configured to control the transmitter to transmit information indicating a first rank used most for the UE during a predetermined time period,
 wherein the channel quality indication information includes a channel quality indicator calculated based on a first number of UEs corresponding to the first rank.

16. The base station of claim 15, wherein the processor is further configured to control the transmitter to transmit information indicating a second rank used second most for the UE during the predetermined time period,
 wherein the channel quality indication information further includes a channel quality indicator calculated based on a second number of UEs corresponding to the second rank.

* * * * *